(12) United States Patent
Bray (10) Patent No.: US 10,017,358 B2
(45) Date of Patent: Jul. 10, 2018

(54) HYDRAULIC ELEVATOR SYSTEM AND METHOD

(71) Applicant: ThyssenKrupp Elevator Corporation, Atlanta, GA (US)

(72) Inventor: Michael Bray, Sandy Springs, GA (US)

(73) Assignee: ThyssenKrupp Elevator Corporation, Atlanta, GA (US)

(*) Notice: Subject to any disclaimer, the term of this patent is extended or adjusted under 35 U.S.C. 154(b) by 847 days.

(21) Appl. No.: 14/300,714

(22) Filed: Jun. 10, 2014

(65) Prior Publication Data

US 2015/0353324 A1    Dec. 10, 2015

(51) Int. Cl.
*B66B 9/04* (2006.01)

(52) U.S. Cl.
CPC ..................... *B66B 9/04* (2013.01)

(58) Field of Classification Search
CPC ......... B66B 9/02; B66B 9/04; B66B 11/0243; B66B 11/0423
USPC ................................................. 187/272, 274
See application file for complete search history.

(56) References Cited

U.S. PATENT DOCUMENTS

| | | | |
|---|---|---|---|
| 2,933,070 A | 4/1960 | Trumper et al. | |
| 3,457,876 A | 7/1969 | Holden | |
| 3,650,356 A * | 3/1972 | Brown | B66B 9/04 187/274 |
| 3,687,015 A | 8/1972 | Chavarria | |
| 4,361,209 A * | 11/1982 | Kappenhagen | B66B 9/04 182/141 |
| 4,363,380 A * | 12/1982 | Rued | B66B 9/04 187/274 |
| 4,745,745 A | 5/1988 | Hagin | |
| 5,579,868 A | 12/1996 | Pelto-Huikko | |
| 5,597,987 A * | 1/1997 | Gilliland | B66B 1/24 187/274 |
| 5,908,088 A * | 6/1999 | Webster | B66F 7/04 182/141 |
| 6,098,759 A | 8/2000 | Rossman et al. | |
| 6,431,322 B1 * | 8/2002 | Rossman | B66B 7/027 187/272 |
| 6,957,721 B2 * | 10/2005 | Moser | B66B 9/04 187/275 |
| 7,770,696 B2 | 8/2010 | Futahashi et al. | |

(Continued)

FOREIGN PATENT DOCUMENTS

| | | | | |
|---|---|---|---|---|
| DE | 3629032 A1 * | 4/1988 | ............... | B66B 1/24 |
| DE | 19952581 A1 * | 5/2001 | ............... | B66B 9/04 |

(Continued)

OTHER PUBLICATIONS

EPO, Machine Translation, DE 3629032 A1, Sep. 13, 2011, pp. 3-4.*

*Primary Examiner* — Michael R Mansen
(74) *Attorney, Agent, or Firm* — Frost Brown Todd LLC (57) ABSTRACT

A hydraulic elevator system is operable to selectively raise and lower an elevator car. The system raises and lowers the elevator car by actuating a hydraulic jack. The system retracts a hydraulic jack that is fixed to an upper portion of the hoistway by pressurizing hydraulic fluid within the hydraulic jack via a hydraulic fluid pump. When retracting the hydraulic jack the elevator car travels upward. An accumulator usable with the system is operable to store energy during the downward travel of the elevator car for later use during the upward travel of the elevator car.

6 Claims, 12 Drawing Sheets

(56) References Cited

U.S. PATENT DOCUMENTS 8,640,829 B2    2/2014  Block et al.
2008/0078624 A1  4/2008  Webster

FOREIGN PATENT DOCUMENTS

| EP | 0314885 A1 | * | 5/1989 | ............... | B66B 9/04 |
| JP | 57030632 A | * | 2/1982 | | |
| WO | WO 2012089760 A1 | * | 7/2012 | ............... | B66B 9/02 |
| WO | WO 2012142711 A1 | * | 10/2012 | ............... | B66B 9/00 |
| WO | WO 2013182209 A1 | * | 12/2013 | ............... | B66B 9/04 |

* cited by examiner

HYDRAULIC ELEVATOR SYSTEM AND METHOD

BACKGROUND

Some conventional elevator systems comprise elevator cars traveling through a hoistway via actuation of a hydraulic jack. In such systems, the elevator car may be pushed upwardly by the actuation of stages of the hydraulic jack. The stages are actuated by pressurizing hydraulic fluid which drives one or more pistons in the hydraulic jack.

While a variety of hydraulic elevator systems have been made and used, it is believed that no one prior to the inventors has made or used an invention as described herein.

SUMMARY

An elevator system for driving an elevator car within a hoistway includes a hydraulic jack configured to drive the elevator car upward within the hoistway when the hydraulic jack retracts, and permit the elevator car to travel downward within the hoistway when the hydraulic jack extends. Also, a hydraulic pump is in fluid communication with the hydraulic jack and configured to direct hydraulic fluid to the hydraulic jack. In some embodiments, an accumulator is included that is in fluid communication with the hydraulic jack and is configured to receive pressurized hydraulic fluid from the hydraulic jack to store energy during the downward travel of the elevator car. The hydraulic pump may be configured to use the stored energy from the accumulator to direct hydraulic fluid to the hydraulic jack to drive the elevator car upward.

An elevator system for driving an elevator car within a hoistway includes an elevator car, a pump, at least one hydraulic jack in fluid communication with the pump, and an accumulator. An upper portion of the hydraulic jack is fixed at an upper portion of the hoistway, and a lower portion of the hydraulic jack is fixed to the elevator car. The accumulator is in fluid communication with the pump, and the accumulator is configured to store energy during downward travel of the elevator car.

A method of driving an elevator car by a hydraulic lift system that includes at least hydraulic fluid, a hydraulic pump, and a hydraulic jack includes the steps of (a) pumping hydraulic fluid into a hydraulic jack that is attached to an elevator car, so as to drive the hydraulic jack to retract and drive the elevator car in an upward direction within a hoistway, and (b) releasing hydraulic fluid and related hydraulic pressure from within the hydraulic jack so as to permit the hydraulic jack to extend and permit the elevator car to move in a downward direction within the hoistway.

BRIEF DESCRIPTION OF THE DRAWINGS

While the specification concludes with claims which particularly point out and distinctly claim the invention, it is believed the present invention will be better understood from the following description of certain embodiments taken in conjunction with the accompanying drawings. In the drawings, like reference numerals identify the same elements.

The drawings are not intended to be limiting in any way, and it is contemplated that different embodiments may be carried out in other ways, including those not necessarily depicted in the drawings. The accompanying drawings illustrate several aspects of the present invention, and with the description serve to explain the principles of the invention. The present invention is not limited to the precise arrangements shown.

DETAILED DESCRIPTION

The following description of certain embodiments of the invention should not be used to limit the scope of the present invention. Other examples, features, aspects, embodiments, and advantages of the invention will become apparent to those skilled in the art from the following description. As will be realized, various aspects of the present disclosure may take alternate forms, or have alternate or additional embodiments, without departing from the scope of the present disclosure. Accordingly, the drawings and descriptions should be regarded as illustrative in nature and not restrictive.

Figure 1:
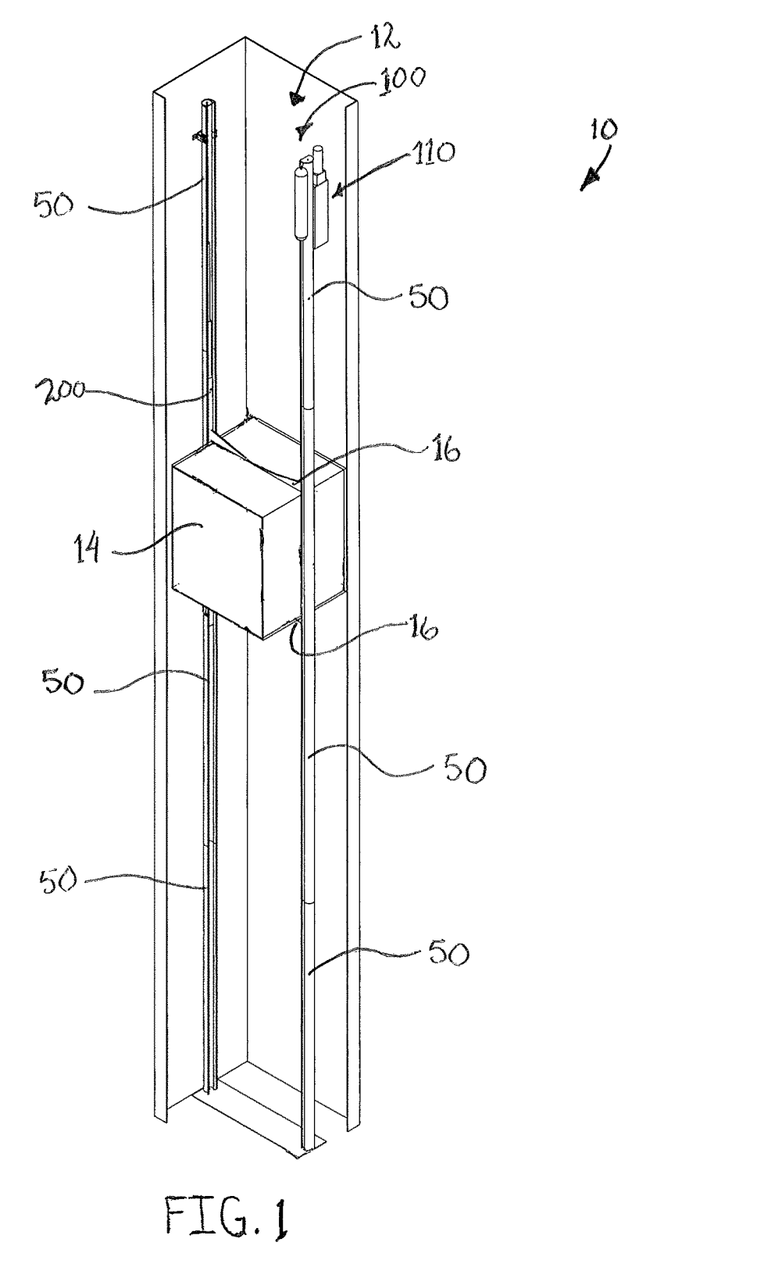
FIG. 1 depicts a perspective view of an embodiment of an elevator system incorporating a hanging or suspended hydraulic system.

FIG. 1 illustrates an embodiment of an elevator system (10). Elevator system (10) comprises a hoistway (12), an elevator car (14), rails (50), and a hanging or suspended hydraulic system (100). Hoistway (12) provides a space through which elevator car (14) can travel vertically. Additionally, hoistway (12) provides a space to mount rails (50) and hanging hydraulic system (100). Although hanging hydraulic system (100) is shown as positioned inside hoistway (12), it should be understood that in other embodiments certain components of hydraulic system (100) may be positioned in a separate space outside of hoistway (12).

Elevator car (14) is configured to travel within hoistway (12) along rails (50). Elevator car (14) is connected with hydraulic system (100). As will be described in greater detail below, hydraulic system (100) provides lifting force suitable to permit elevator car (14) to move a load within hoistway (12).

Figure 2:
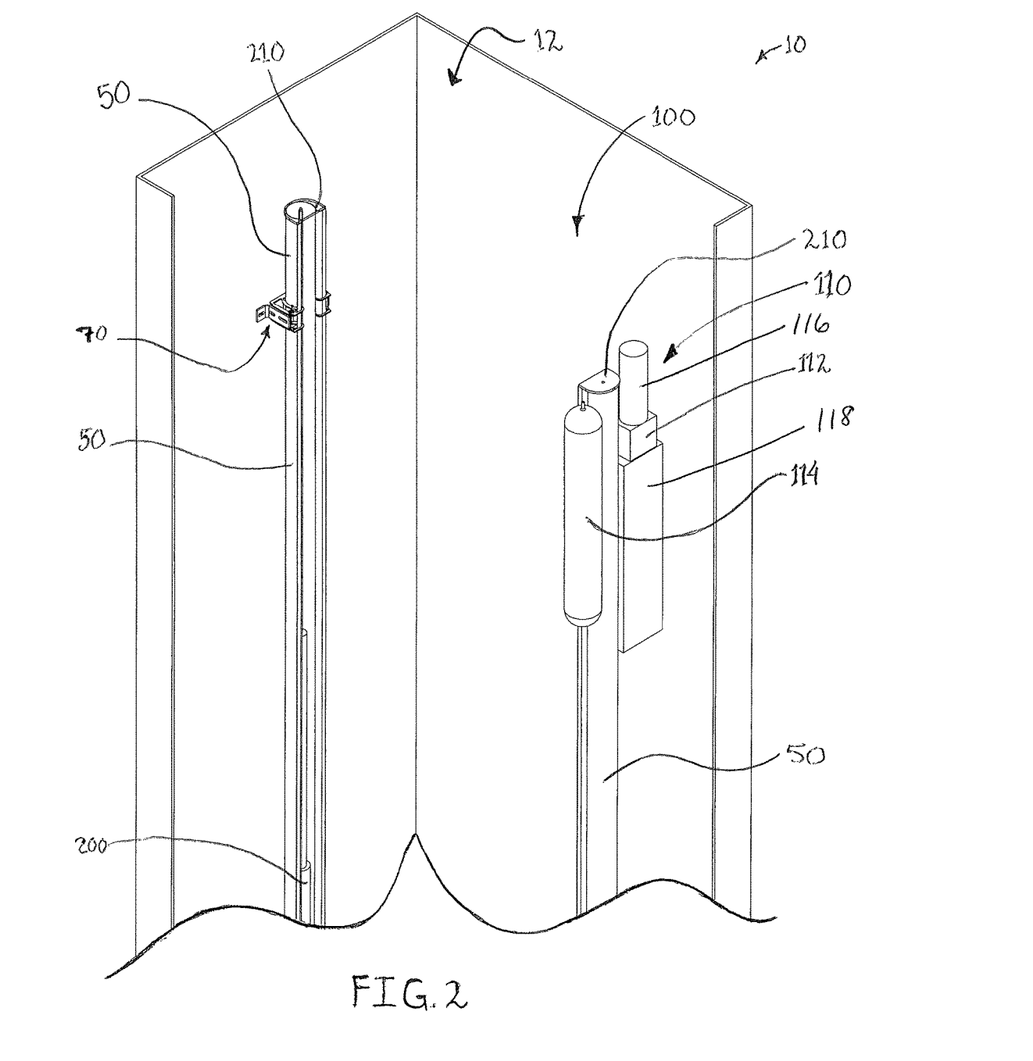
FIG. 2 depicts an enlarged perspective view of the hanging hydraulic system of FIG. 1.

FIG. 2 illustrates a detailed view of hydraulic system (100) mounted to an end of one rail (50). Hydraulic system (100) comprises a machine assembly (110) and hydraulic jacks (200) located on each side of elevator car (14) within an interior space of rails (50). Each hydraulic jack (200) is attached to and suspended from an upper end of the respective rail (50) to which it is mounted, wherein in a retracted state, each hydraulic jack is compactly positioned at the upper end of the respective rail to which it is attached. As the jack extends from a retracted state to an extended state, each hydraulic jack extends substantially downward from the upper end of the rail to which it is affixed along the length of each rail within which it is disposed. Each hydraulic jack (200) is connected with machine assembly (110) such that each hydraulic jack (200) can receive and expel hydraulic fluid, as will be described further below. In an alternate embodiment, each jack (200) may have its own machine assembly (110) that may be controlled synchronously, without departing from the scope of the present disclosure. Because each hydraulic jack (200) is configured the same way, any description of one hydraulic jack (200) is equally applicable to the other hydraulic jack (200). Machine assembly (110) comprises a hydraulic pump (112), an accumulator (114), a motor (116), and a hydraulic tank (118). Hydraulic pump (112) may be any suitable device operable to pump hydraulic fluid and will be apparent to one of ordinary skill in the art in view of the teachings herein. In an alternative embodiment, hydraulic pump (112) may be comprised of a plurality of hydraulic pumps. Motor (116) may be any suitable device operable to power hydraulic pump (112) such as an electric motor, pneumatic motor, gas motor, or the like.

Accumulator (114) is configured to store potential energy that exists in pressurized fluids. Accumulator (114) may be any suitable type of mechanical or electromechanical accumulator (114). A suitable mechanical accumulator (114) may include piston, bladder, spring, weight loaded or any other suitable type of mechanical accumulator (114). A suitable electromechanical accumulator (114) may include a generator operable to convert moving hydraulic fluid into electric energy which then may be stored in a power source for later consumption. Additionally, a suitable electromechanical accumulator (114) may be combined with hydraulic pump (112) such that the motor can act as a hydraulic pump (112) when pumping hydraulic fluid and as an accumulator when hydraulic fluid is flowing through it. Other suitable accumulators will be apparent to those of ordinary skill in the art in view of the teachings herein.

Hydraulic pump (112) may be configured to actuate the hydraulic jack (200) between a retracted and extended state. For instance, in some embodiments hydraulic pump (112) pumps hydraulic fluid into hydraulic jack (200), thus using mechanical energy to build pressure within hydraulic jack (200). As will be described in greater detail below, in the present disclosure, an increase of hydraulic pressure within the hydraulic jack (200) causes hydraulic jack (200), and its associated rods or pistons, to retract to a compact retracted state. Accordingly, with an upper end of the hydraulic jack (200) affixed to an upper end of rail (50), such retraction causes the hydraulic jack to retract from the bottom in an upward direction. Furthermore, the hydraulic jack (200) may be actuated to an extended state when hydraulic fluid exits, or is forced out of, the hydraulic jack (200) and flows back to accumulator (114) for storage and future use. Excess hydraulic fluid may flow from the accumulator into hydraulic tank (118) for storage and future use. Accumulator (114) may be operable to store pressurized hydraulic fluid, thus converting a portion of the mechanical energy exerted by hydraulic pump (112) to potential energy stored in accumulator (114). Hydraulic jack (200) may then be retracted a second time, using the stored potential energy of accumulator (114) and the mechanical energy of hydraulic pump (112). Accumulator (114) is not required in all embodiments. In one embodiment of hydraulic system (110), hydraulic fluid exits, or is forced out of, the hydraulic jack (200) and flows directly to hydraulic tank (118) for future use.

The hydraulic jack (200) of the present disclosure is unlike many typical single-acting piston or rod style hydraulic jacks, which typically operate by extending the pistons of the jack when the pressure inside the casing of the hydraulic jack is increased, and retracting the rod(s) or piston(s) of the jack when external forces (e.g. weight and gravity) drive the hydraulic fluid out of the jack back to a hydraulic tank or an accumulator.

Although the above disclosed embodiment of a hydraulic jack (200) utilized herein generally describes a single-acting hydraulic jack, it should be understood that double-acting hydraulic jacks, which permit control and actuation of the jack's extension and retraction by use of hydraulic pressure in two-directions, may be utilized herein without departing from the scope of the present disclosure. In such embodiments, more than one hydraulic pump and or accumulator may be employed as needed.

It should be understood that machine assembly (110) may further comprise other components not described in detail herein. In particular, machine assembly (110) may include valves, fluid reservoirs, control modules, etc. In other embodiments, machine assembly (110) may comprise any suitable combination of the aforementioned components in any suitable configuration as may be required to actuate hydraulic jack (200). These various combinations and/or configurations will be apparent to those of ordinary skill in the art in view of the teachings herein.

Figure 3:
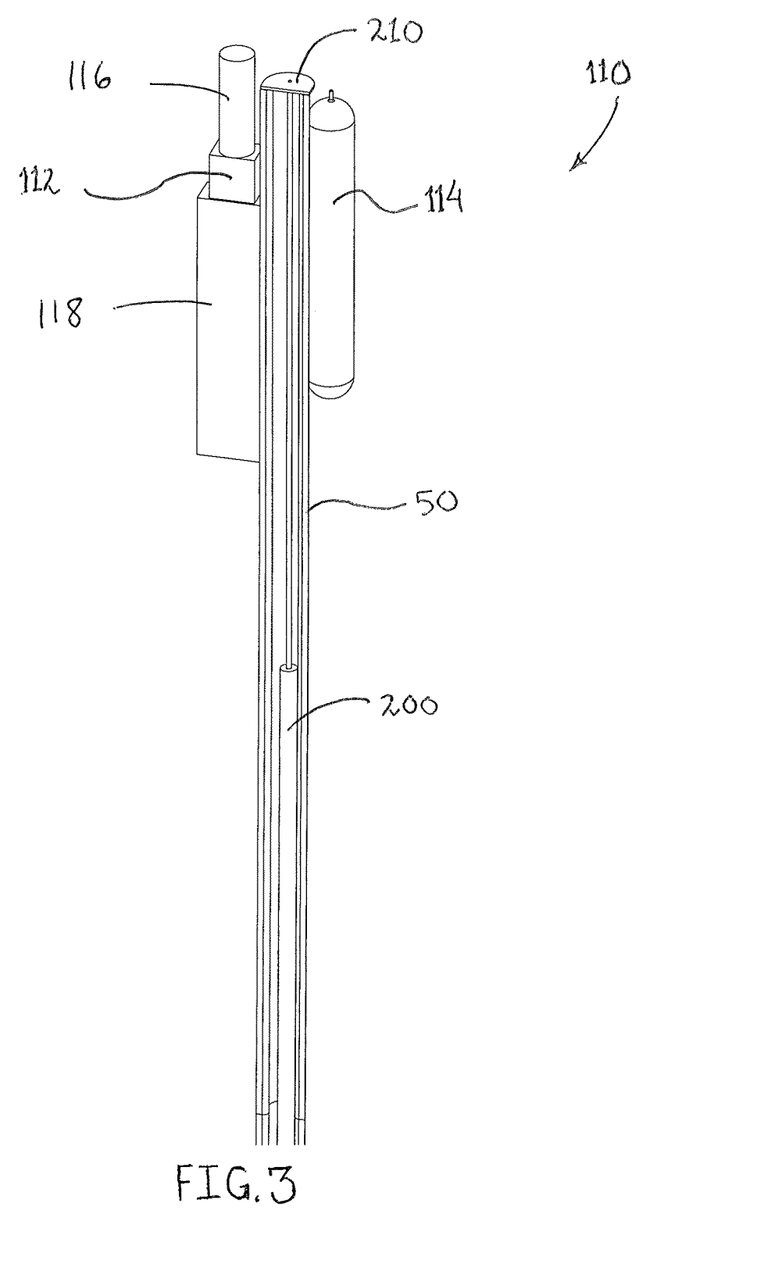
FIG. 3 depicts an alternate enlarged perspective view of the hanging hydraulic system of FIG. 1.

FIG. 3 illustrates a rail attachment portion (210) of hydraulic jack (200) attached to the end of rail (50). Hydraulic jack (200) within rail (50) extends downward from the rail attachment portion (210) to elevator car (14) where hydraulic jack (200) attaches thereto. Thus in the illustrated embodiment, hydraulic jacks (200) are mounted in an upper region of the hoistway (12). In this embodiment, hydraulic jacks (200) are affixed to and suspended from an upper region of the hoistway (12) by attaching an upper end of the hydraulic jacks (200) to the upper portion of rails (50).

Figure 4:
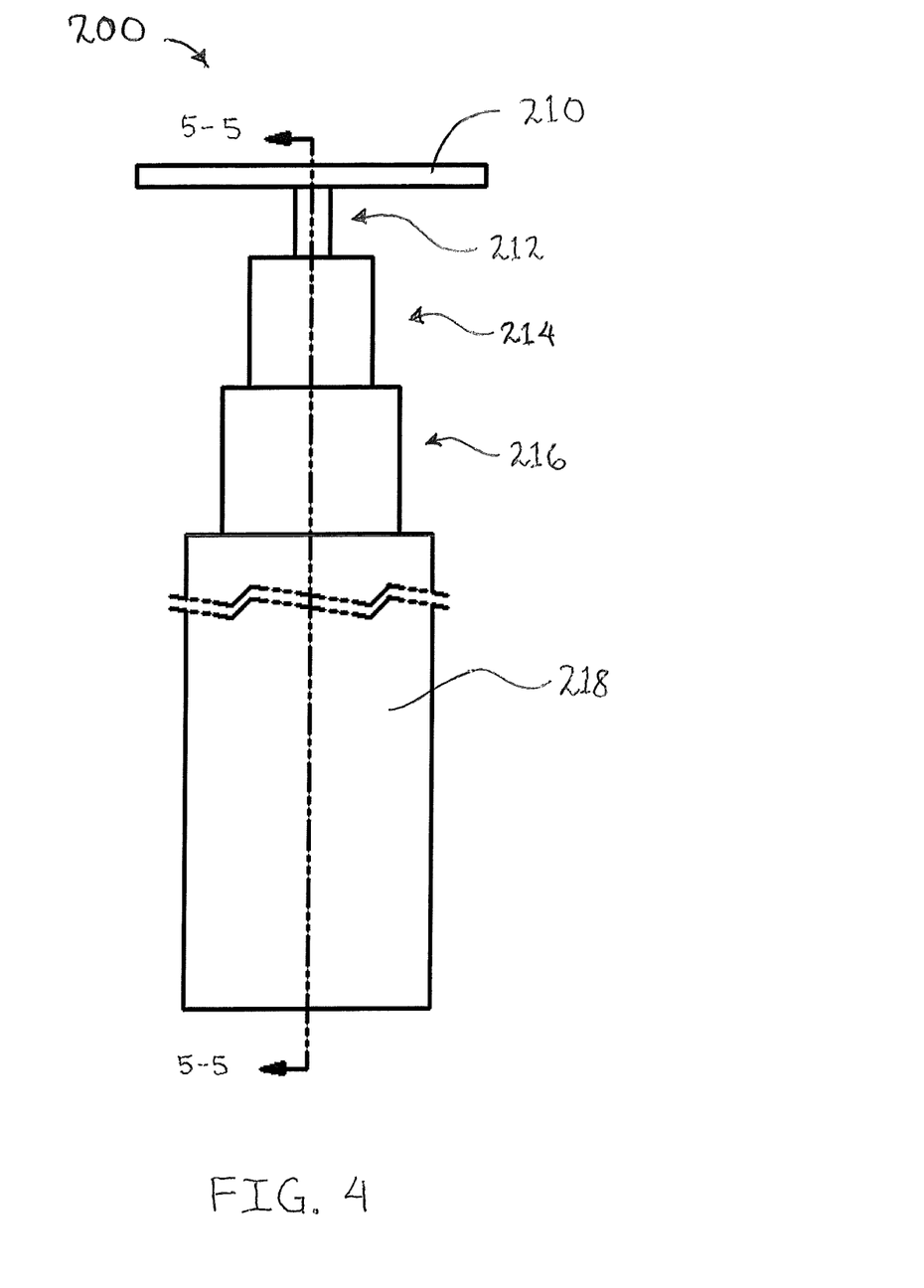
FIG. 4 depicts a side view of a hydraulic jack of the hydraulic system of FIG. 1, with the hydraulic jack in a retracted state.

FIG. 4 illustrates multistage hydraulic jack (200) in a retracted state. As can be seen, hydraulic jack (200) is a telescoping hydraulic jack having three stages (212, 214, 216) extending from a casing (218). Stages (212, 214, 216) successively nest inside of each other. In particular, a first stage (212) nests inside a second stage (214), which nests inside a third stage (216). Similarly, one or more stages (212, 214, 216) may nest inside casing (218). First stage (212) is positioned furthest from casing (218), relative to the other two stages (214, 216), when hydraulic jack (200) is in either of the retracted or extended states. An upper end of first stage (212) is connected to attachment portion (210), which is connected to an upper portion of rails (50) as mentioned above. At the same time, elevator car (14) is affixed to and suspended from casing (218). As hydraulic jack (200) moves from a retracted state to an extended state and vice versa, elevator car (14) travels in a corresponding manner. It should be understood that in alternate embodiments, hydraulic jack (200) may be comprised of fewer or more stages than the number of stages discussed above, without departing from the scope of the present disclosure.

Figure 5:
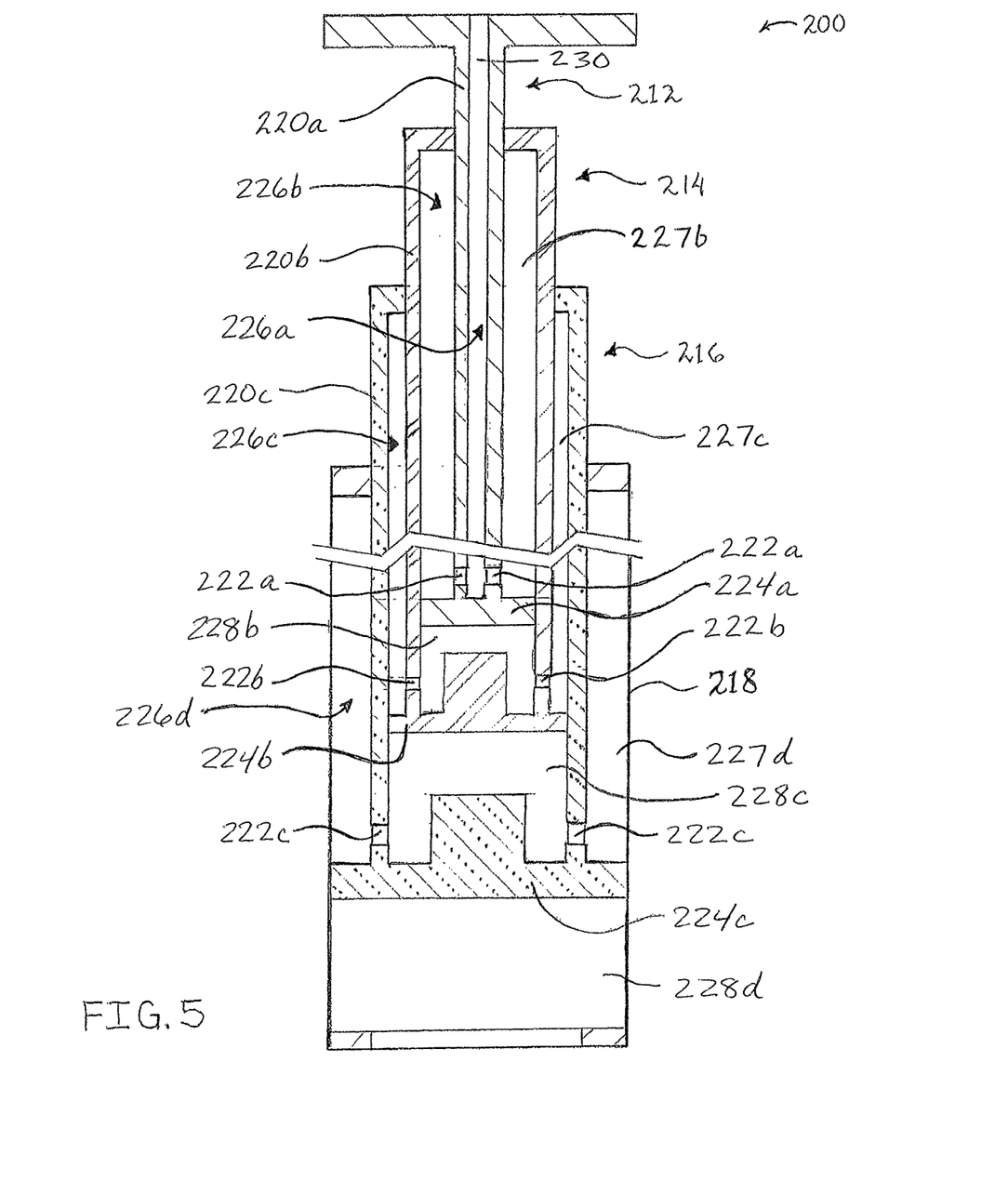
FIG. 5 depicts a side cross-sectional view of the hydraulic jack of FIG. 4, with the cross section taken along line 5-5 of FIG. 4.

FIG. 5 illustrates a cross section of an embodiment of hydraulic jack (200) in a retracted state, wherein the cross section is taken along line 5-5 of FIG. 4. Each stage (212, 214, 216) comprises a cylinder (220*a*, 220*b*, 220*c*), a valve section (222a, 222b, 222c), and a piston (224a, 224b, 224c). Cylinders (220a, 220b, 220c) are each connected to respective pistons (224a, 224b, 224c) as shown. It should be understood that each of these components may be generally the same in shape and operation between each stage (212, 214, 216) with the size varying to correspond to the size of an individual stage (212, 214, 216). For instance, piston (224a) of first stage (212) is smaller relative to piston (224c) of third stage (216) because piston (224a) of first stage (212) is configured to fit within cylinder (220b) of second stage (214), while piston (224c) of third stage (216) is configured to fit within casing (218).

Within each stage (212, 214, 216) is a chamber (226a, 226b, 226c) configured to hold hydraulic fluid. Similarly there is a chamber (226d) disposed within the casing (218). The respective chambers (226b, 226c, 226d) of the second stage (214), third stage (216), and casing (218) each have a divided configuration in which a piston (224a, 224b, 224c) disposed within each chamber separates each chamber (226b, 226c, 226d) into a respective upper portion (227b, 227c, 227d) and lower portion (228b, 228c, 228d). Valve section (222a) connects chamber (226a) of first stage (212) with upper portion (227b) of chamber (226b) of second stage (214). Valve section (222b) connects lower portion (228b) of chamber (226b) of second stage (214) with upper portion (227c) of chamber (226c) of third stage (216). Valve section (222c) connects lower portion (228c) of chamber (226c) of third stage (216) with upper portion (227d) of chamber (226d) of casing (218).

Figure 6:
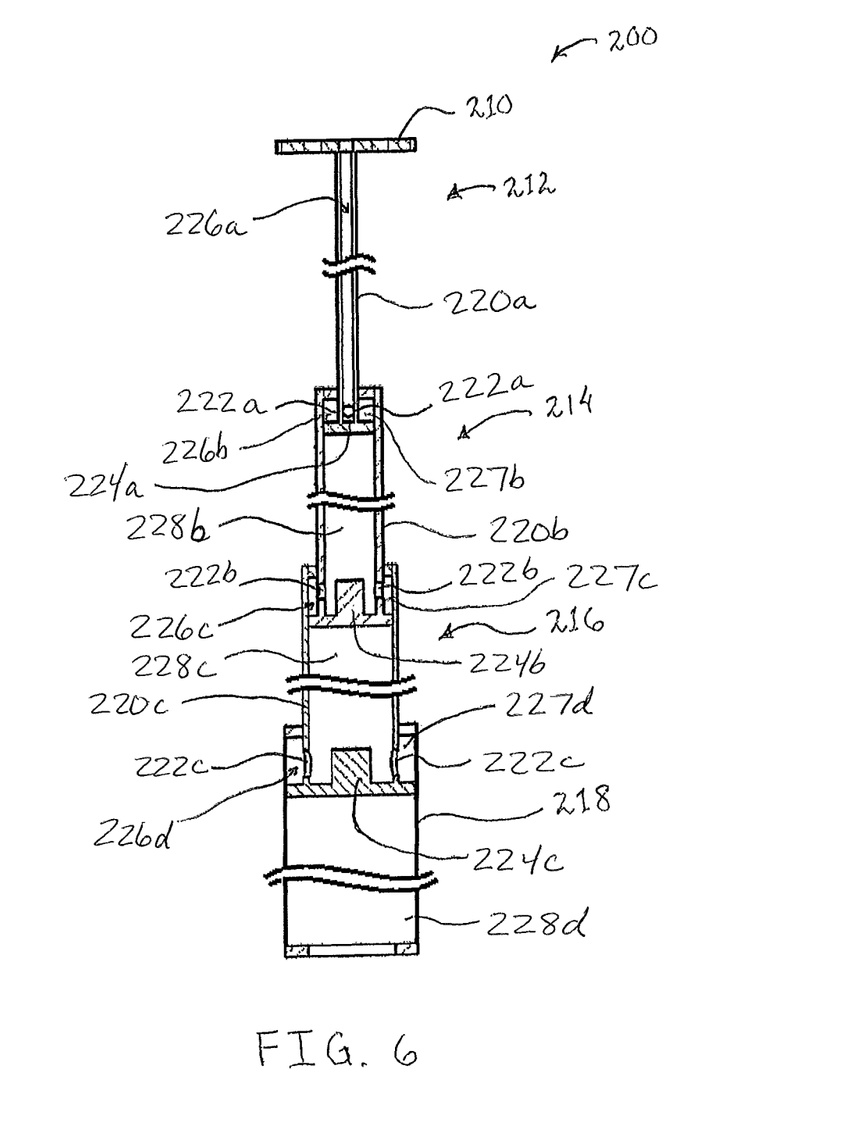
FIG. 6 depicts a side cross-sectional view of the hydraulic jack of FIG. 4 taken along line 5-5 of FIG. 4, with the hydraulic jack in an extended state.

FIGS. 5-6 illustrate cross sectional views of an embodiment of a hydraulic jack (200) in each of the retracted state (see FIG. 5) and the extended state (see FIG. 6). The volume of hydraulic fluid contained within the three telescoping stages (212, 214, 216) of hydraulic jack (200) is at its greatest when the hydraulic jack (200) is in the retracted state, and is at its least when the hydraulic jack (200) is in the extended state. In either state the overall total volume of hydraulic fluid contained within hydraulic system (100) remains constant, with the total fixed volume of hydraulic fluid being contained in varying amounts within hydraulic jacks (200), hydraulic pump (112), accumulator (114), hydraulic tank (118) and various transfer lines or pipes connecting these components.

In general, referring still to FIGS. 5 and 6, in the configuration depicted in the present embodiment, hydraulic fluid (230) enters and exits hydraulic jack (200) through an opening in the upper end of the first stage (212), where it respectively flows into or out of the chamber (226a) of the first stage (212). In the present embodiment there is an opening disposed in rail attachment portion (210) that is connected to, and in fluid communication with, chamber (226a) of first stage (212), through which hydraulic fluid enters and exits hydraulic jack (200). When the hydraulic jack (200) is in a fully extended state, an elevator car (14) affixed to and suspended from the casing (218) of the hydraulic jack is positioned at the bottom floor (or the lowest serviceable floor) in the elevator shaft. When hydraulic fluid is pumped into hydraulic jack (200) through the opening in the upper end of the first stage (212), the hydraulic pressure above each of the pistons (224a, 224b, 224c) increases, which causes the second and third stages (214, 216) as well as the casing (218) of the jack to retract with respect to the first stage (212) that is fixed to the rail attachment portion (210). The upward retraction of each individual stage (214, 216) as well as the casing (218) in turn cause the elevator car (14) to travel upward within the shaft as hydraulic jack (200) retracts in an upward direction.

Movement of Stage 1-2

In further detail of such embodiment, hydraulic fluid is pumped through an opening (e.g. a valve opening, or other suitable opening) disposed in the top of the cylinder (220a) of the first stage (212) and into the first stage chamber (226a). The hydraulic fluid flows downward within the first stage chamber (226a), through the valve section (222a), and into the upper portion (227b) of the chamber (226b) of second stage (214). The upper portion (227b) and lower portions (228b) of the second stage chamber (226b) are sealed off from each other by the first stage piston (224a) slidably forming a fluid tight seal against an inner surface of the second stage cylinder (220b). Therefore, the sliding seal interface between the piston (224a) and the second stage cylinder (220b) prevents hydraulic fluid from flowing between the upper and lower portions (227b, 228b) of the second stage chamber (226b).

Accordingly, as hydraulic fluid is pumped into the upper portion of the second stage chamber through the first stage valve section (222a), pressure builds within the upper portion (227b) of the second stage chamber (226b) and the cylinder (220b) of the second stage (214) is slidingly driven upward with respect to the first stage piston (224a) and first stage cylinder (220a). The upward sliding movement of the second stage cylinder (220b) with respect to the first stage piston (224a) and first stage cylinder (220a) also causes an increase in volume of the upper portion (227b) of the second stage chamber (226b), which continues to fill with hydraulic fluid pumped into it through the first stage chamber (226a) and valve section (222a).

Movement of Stage 2-3

Because the lower portion (228b) and the upper portion (227b) of the second stage chamber (226b) are sealed off from each other by the first stage piston (224a) slidingly disposed there between, the upward movement of the second stage cylinder (220b) with respect to the first stage piston (224a) causes the lower portion (228b) of the second stage chamber (226b) to correspondingly decrease in volume as the upper portion (227b) of the second stage chamber (226b) increases in volume. The lower portion (228b) of the second stage chamber (226b) and the upper portion (227c) of the third stage chamber (226c) together contain a fixed volume of hydraulic fluid, and are in fluid communication with each other by the second stage valve section (222b). Similarly to the second stage chamber, the upper portion (227c) and lower portions (228c) of the third stage chamber (226c) are sealed off from each other by the second stage piston (224b) slidably forming a fluid tight seal against an inner surface of the third stage cylinder (220c) and preventing hydraulic fluid from flowing between the upper and lower portions (227c, 228c) of the third stage chamber (226c). Therefore, the fixed volume of hydraulic fluid contained within the space defined by the lower portion (228b) of the second stage chamber (226b) and the upper portion (227c) of the third stage chamber (226c) is sealed off from other hydraulic fluid volumes in the system (100) by both of the first stage piston (224a) and the second stage piston (224b). Accordingly, the aforementioned decrease in volume of the lower portion (228b) of the second stage chamber (226b) causes a corresponding increase in the pressure of the hydraulic fluid contained therein. This increased hydraulic pressure forces the hydraulic fluid to flow through the second stage valve section (222b) into the upper portion (227c) of the third stage chamber (226c).

As hydraulic fluid is forced into the upper portion of the third stage chamber (227c), pressure builds therein and slidingly drives the cylinder (220c) of the third stage (216)

upward with respect to the each of the first and second stage pistons (224a, 224b) and first and second stage cylinders (220a, 220b). The upward sliding movement of the third stage cylinder (220c) also causes an increase in volume of the upper portion (227c) of the third stage chamber (226c), which continues to fill with hydraulic fluid forced into it from the lower portion (228b) of the second stage chamber (226b) through valve section (222b).

Movement of Stage 3-Casing

Because the lower and upper portions (227c, 228c) of the third stage chamber (226c) are sealed off from each other by the second stage piston (224b) slidingly disposed there between, the upward movement of the third stage cylinder (220c) with respect to the second stage piston (224b) causes the lower portion (228c) of the third stage chamber (226c) to correspondingly decrease in volume as the upper portion (227c) of the third stage chamber (226c) increases in volume. The lower portion (228c) of the third stage chamber (226c) and the upper portion (227d) of the casing chamber (226d) together contain a fixed volume of hydraulic fluid, and are in fluid communication with each other by the third stage valve section (222c). Similarly to the third stage chamber (226c), the upper and lower portions (227d, 228d) of the casing chamber (226d) are sealed off from each other by the third stage piston (224c) slidably forming a fluid tight seal against an inner surface of the casing and thus prevent hydraulic fluid from flowing between the upper and lower portions (227d, 228d) of the casing chamber (226d). Therefore, the fixed volume of hydraulic fluid contained within the space defined by the lower portion (228c) of the third stage chamber (226c) and the upper portion (227d) of the casing chamber (226d) is sealed off from other hydraulic fluid volumes in the system (100) by both of the second stage piston (224b) and the third stage piston (224c). Accordingly, the aforementioned decrease in volume of the lower portion (228c) of the third stage chamber (226c) causes a corresponding increase in the pressure of the hydraulic fluid contained therein. This increased hydraulic pressure forces the hydraulic fluid to flow through the third stage valve section (222c) into the upper portion (227d) of the casing chamber (226d).

As hydraulic fluid is forced into the upper portion (227d) of the casing chamber (226d), pressure builds therein and slidingly drives the jack's outer casing (218) upward with respect to the each of the first, second, and third stage pistons (224a, 224b, 224c) and first, second, and third stage cylinders (220a, 220b, 220c). The upward sliding movement of the outer casing (218) also causes an increase in volume of the upper portion (227d) of the casing chamber (226d), which continues to fill with hydraulic fluid forced into it from the lower portion (228c) of the third stage chamber (226c) through valve section (222c). The lower portion (228d) of the jack's outer casing (218) contains no hydraulic fluid and is either open to atmospheric pressure, is otherwise not sealed with respect to the surrounding air and environment.

With hydraulic jack (200) fixed and suspended from the upper portion of hoistway (12) via its connection to the upper portion of rail (50), when hydraulic fluid is pumped under pressure to fill the first stage chamber (226a) and the upper portion (227b) of the second stage chamber (226b), the pressure within hydraulic system (100), causes hydraulic jack (200) to retract in an upward direction. Because the elevator car (14) is connected to the jack's outer casing (218), the elevator car (14) also travels in an upward direction as additional hydraulic fluid continues to be pumped into the hydraulic jack (200) and the hydraulic jack (200) continues to retract.

To actuate hydraulic jack (200) from the retracted state to the extended state, the elevated hydraulic pressure built up within the hydraulic jack (200) is released and hydraulic fluid is permitted to flow back out of hydraulic jack (200) to an accumulator in the hydraulic system (100). In particular, hydraulic fluid flows from upper portion (227b) of chamber (226b) though valve section (222a) into chamber (226a) and then out of chamber (226a) and into accumulator (114). As described above, accumulator (114) may be configured to store the pressurized hydraulic fluid as potential energy that may be used later in other applications. For example, in some embodiments, the potential energy from pressurized hydraulic fluid is received by and stored in accumulator (114) during the downward travel of elevator car (14) when hydraulic jack (200) is extended to its extended state. That potential energy can then be released back into the hydraulic system and used to assist with the pumping of the hydraulic fluid back into hydraulic jack (200), so as to retract hydraulic jack (200) and cause upward travel of elevator car (14) in a subsequent trip. Other ways to convert and use the energy from the pressurized hydraulic fluid with accumulator (114) will be apparent to those of ordinary skill in the art in view of the teachings herein.

Also during the actuation of hydraulic jack (200) from the retracted state to the extended state, the hydraulic pressure exhibited within the lower portion (228b) of the second stage chamber (226b), as created by the volume of hydraulic fluid retained within lower portion (228b) of the second stage chamber (226b), decreases as the volume of the lower portion (228b) increases, when the second stage cylinder (220b) moves downward relative to first stage cylinder (220a). Hydraulic fluid from the upper portion (227c) of the third stage chamber (226c) moves from a region of higher pressure within the upper portion (227c) to the expanding volume and lower pressure region within the lower portion (228b) of the second stage chamber (226b). At the same time, the cylinder (220c) of the third stage (216) moves downward relative to the cylinder (220b) of the second stage (214) further extending hydraulic jack (200).

A similar process occurs within the lower stages. For instance, the pressure of the original hydraulic fluid retained within lower portion (228c) of third stage chamber (226c) decreases as the volume of the lower portion (228c) increases as cylinder (220c) of third stage (216) moves downward relative to the cylinder (220b) of the second stage (214). Hydraulic fluid from the upper portion (227d) of casing chamber (226d) moves from a region of higher pressure within the upper portion (227d) to the expanding volume and lower pressure region within the lower portion (228c) of third stage chamber (226c). At about the same time, the casing (218) moves downward relative to cylinder (220c) of third stage (216) further extending hydraulic jack (200) in a downward direction. Because elevator car (14) is connected to casing (218), elevator car (14) travels downward as hydraulic jack (200) is extended.

From the above description, it can be observed that in the present embodiment, there exists a first fixed and sealed amount of hydraulic fluid contained in the combined space defined by the lower portion (228b) of the second stage chamber (226b) and the upper portion (227c) of the third stage chamber (226c), as well as a second fixed amount of hydraulic fluid contained in the combined space defined by the lower portion (228c) of the third stage chamber (226c) and the upper portion (227d) of the casing chamber (226d).

In other words, the first fixed amount of hydraulic fluid is merely transferred back and forth between the lower portion (228b) of the second stage chamber (226b) and the upper portion (227c) of third stage chamber (226c), while the second fixed amount of hydraulic fluid is merely transferred back and forth between the lower portion (228c) of the third stage chamber (226c) and the upper portion (227d) of the casing chamber (226d) respectively. While the amount of hydraulic fluid remains unchanged in these two spaces, it does undergo pressure changes based on either (a) an increase or decrease of hydraulic pressure imparted into the first stage cylinder (220a) by the hydraulic pump (112) to effect an acceleration or deceleration of the elevator car and total suspended load, or (b) changes to the active load (e.g. combined weight of elevator car, passengers and/or cargo) pulling downward on the hydraulic jacks, which change the tensile forces imparted to the hydraulic jacks.

Similarly from the above description, it can be observed that in the present embodiment, the amount of hydraulic fluid does change within stages (212, 214) and more specifically as between the first stage chamber (226a) and the upper portion (227b) of the second stage chamber (226b). As mentioned, hydraulic fluid enters stage (212) into chamber (226a) from the top of hydraulic jack (200). The hydraulic fluid can be pumped into chamber (226a) by hydraulic pump (112) from hydraulic tank (118) or from the accumulator (114) in an alternate embodiment. Based on the above description, hydraulic jacks (200) can be described as having one or more stages that are unsealed and can exchange amounts of hydraulic fluid, and one or more stages that are sealed and cannot exchange amounts of hydraulic fluid. In all stages, the contained hydraulic fluid can be contained at varying pressures depending on the state of the hydraulic jacks (200) in terms of extension and retraction.

In an additional aspect of an embodiment of the hydraulic system (100) as disclosed herein, hydraulic system (100) may be configured to be synchronous in operation. For instance, the configuration of hydraulic jacks (200) and the flow of hydraulic fluid can be configured such that stages (212, 214, 216) and casing (218) extend and retract in a synchronous fashion. For instance, in certain embodiments, stages (212, 214, 216) and casing (218) can be configured to extend and retract relative to one another at the same rate. In still alternate embodiments, the extension and contraction of stages (212, 214, 216) and casing (218) may occur at the same rates, but in sequence or overlapping sequence such that it is possible for one stage to be extended or retracted relative to a second stage before a second stage is extended or retracted relative to a third stage. In yet additional alternate embodiments, the various stages are not required to operate synchronously and can be configured to operate at different rates. In view of the teachings herein, other ways to configure hydraulic system (100) to achieve various operating parameters and configurations will be apparent to those of ordinary skill in the art.

Still other features of elevator system (10) having hydraulic system (100) include the hydraulic pump (114) or drive, accumulator (114), and hydraulic tank (118) being located at the top or upper portion of hoistway (12). In addition, for embodiments utilizing hydraulic jacks (200) suspended from the upper portion of hoistway (12) via connection with rails (50), smaller diameter jacks can be used to support a given load. In other words, compared to a conventional system using hydraulic jacks that are not suspended, but rather mounted to the floor within a hoistway and which support the elevator car from beneath, for the same load the diameter of the jacks mounted to the floor would need to be greater than jacks that are suspended. With the smaller diameter suspended hydraulic jacks (200) of the illustrated embodiment, operating pressures are increased. At such higher operating pressures, accumulator (114) can be more efficient in harvesting energy for reuse in the system or in other applications.

In one embodiment of elevator system (10), hydraulic system (100) uses about 34 gallons of hydraulic fluid or oil to operate an elevator system (10) having a 5000 pound capacity for 50 feet of travel. In this embodiment, only about 8 gallons of hydraulic fluid transfers between hydraulic jacks (200), accumulator (114), and hydraulic tank (118) in operating the elevator system (10) through its 50 feet of travel. The about 26 gallons of remaining hydraulic fluid remain within hydraulic jacks (200), transferring between the upper and lower portions of chambers (226c, 226d). In this embodiment, the outer diameter of the outer casing (218) of hydraulic jacks (200) is a minimum of 6 inches for the 5000 pound capacity. Also, in this embodiment the operating pressure can range from a minimum of about 1,300 pounds per square inch (psi) to a maximum of about 3,500 psi. The above embodiment is not intended to be restrictive and other parameters for elevator system (10) and hydraulic system (100) will be apparent to those of ordinary skill in the art in view of the teachings disclosed herein.

Figure 7:
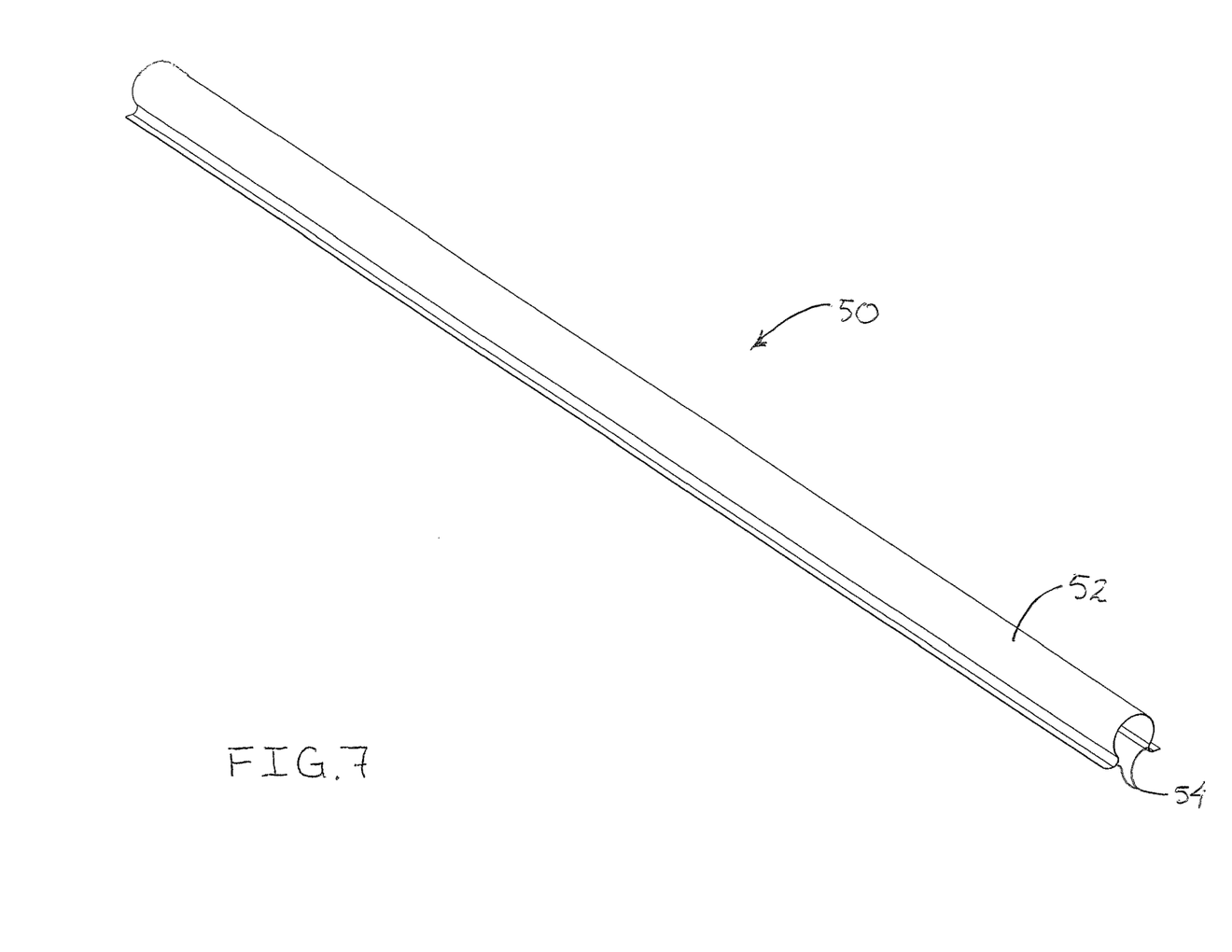
FIG. 7 depicts a perspective view of an embodiment of a rail used with the elevator system of FIG. 1.
Figure 8:
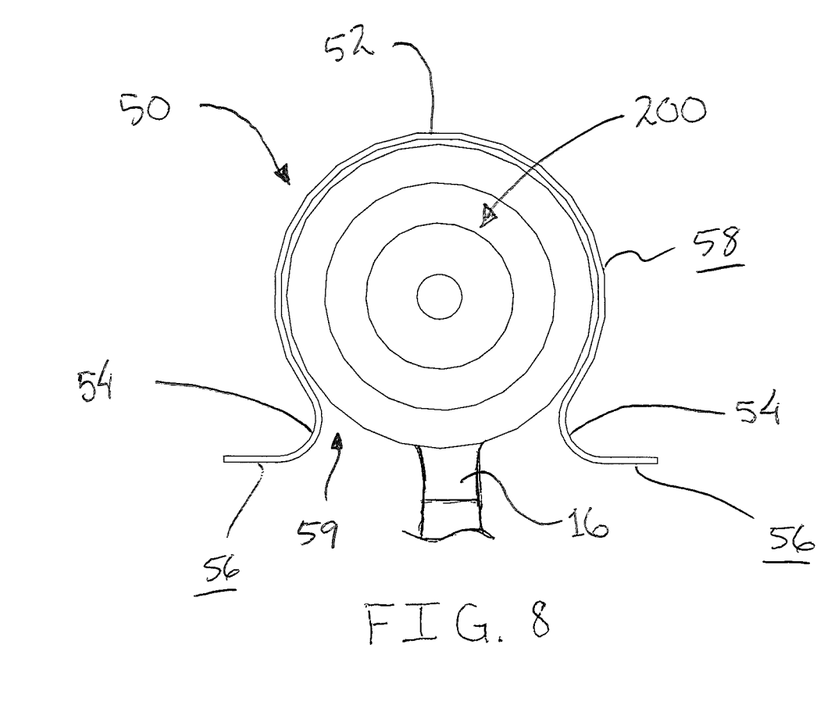
FIG. 8 depicts a top view of the rail of FIG. 7, containing the hydraulic jack of FIG. 4 disposed within an interior space thereof.

FIG. 7 illustrates a perspective view of rail (50). As can be seen in FIG. 8, rail (50) is configured to house a hydraulic jack (200). A transverse cross section of rail (50) generally has the shape of the letter omega of the Greek alphabet. With this shape, rail (50) comprises interior space (59), and rail (50) may wrap around a portion of hydraulic jack (200) such that hydraulic jack (200) is positioned within interior space (59). Yet, rail (50) leaves a longitudinal portion of hydraulic jack (200) exposed as well. This exposed portion may permit attachment of elevator car to a portion of hydraulic jack (200), e.g. attachment of elevator car (14) to casing (218) of hydraulic jack (200) as discussed above. In the illustrated embodiment of FIGS. 1 and 8, attachment of elevator car (14) to hydraulic jacks (200) is by way of attachment member (16). Although the figures of the present disclosure generally show rail (50) as having an omega cross-sectional shape, it should be understood that rail (50) may have other suitable shapes that accommodate hydraulic jacks (200). Such other suitable shapes of rail (50) may include U-shaped, C-shaped, among others that will be apparent to those of ordinary skill in the art in view of the teachings herein.

Rails (50) are also configured such that elevator car (14) can be guided along rails (50) during its travel. In this way, elevator (14) travels along rails (50). In the present embodiment, rails (50) comprise an inside surface (56) along which elevator car (14) is guided during its travel. Rails (50) further comprise an outside surface (58) and sections of rail (50) can be spliced along the outside surface (58).

Figure 9:
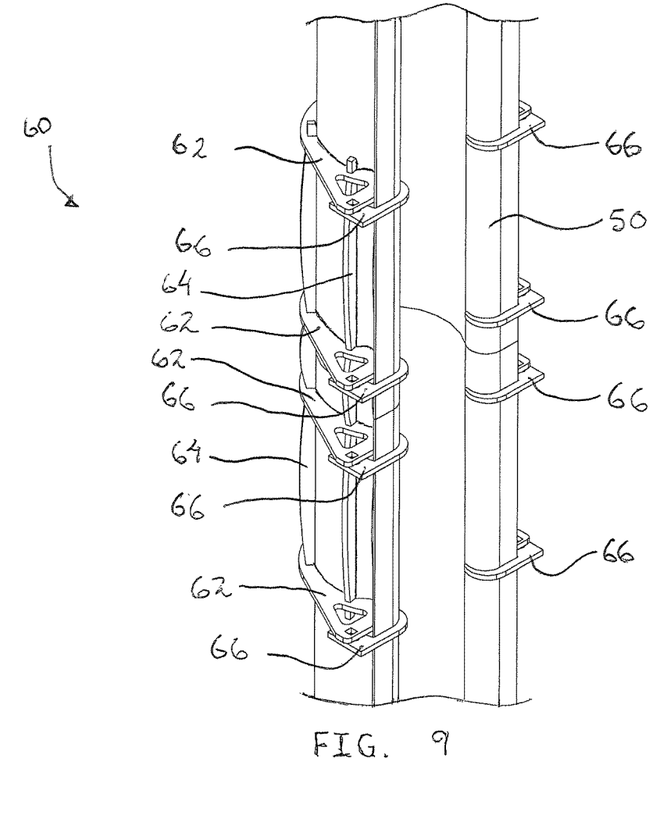
FIG. 9 depicts a perspective view of an embodiment of a splice assembly connecting two rails of FIG. 7.
Figure 10:
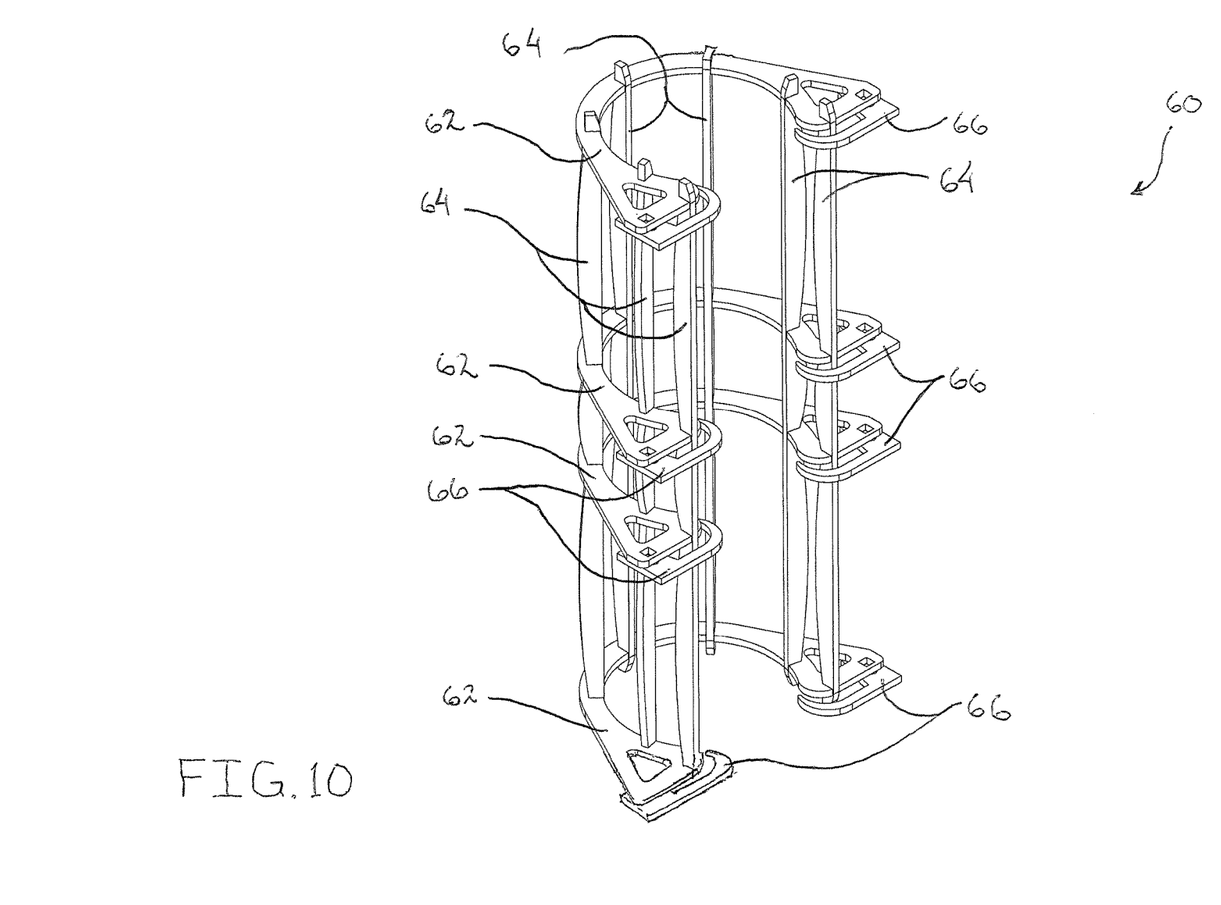
FIG. 10 depicts a perspective view of the splice assembly of FIG. 9, with the two rails removed.

FIGS. 9 and 10 illustrate an embodiment of a rail splice (60). Rail splice (60) comprises four wrap around brackets (62), seven vertical members (64), and eight hooked members (66). Wrap around brackets (62) wrap around a first curved portion (52) of rails (50). Of the four wrap around brackets (62), two are positioned on each rail (50) being spliced. Each vertical member (64) fits into each wrap around bracket (62) spaced evenly around each wrap around bracket (62). Hooked members (66) wrap around a second curved portion (54) of rails (50). Two hooked members (66) correspond to each wrap around bracket (62).

Wrap around brackets (62), vertical members (64), and hooked members (66) engage two rails (50) to splice each rail (50) to the other from the exterior or outside surface (58) of each rail. Each rail (50) may be held rigidly in place relative to the other by wrap around brackets (62), vertical members (64), and hooked members (66). Wrap around brackets (62) and hooked members (66) cooperatively engage rails (50) while leaving a portion of rail (50) open for access to hydraulic jacks (200). Vertical members (64) connect wrap around brackets (62) to one another to prevent longitudinal and transverse movement of each rail (50) relative to the other. Although rail splice (60) is shown has having a particular number of components having particular shapes, it should be understood, that any suitable configuration may be used to splice two rails (50) together from the exterior or outside surface (58) of each rail (50). Indeed, other suitable rail splices (60) having components of varying shapes and configurations will be apparent to those of ordinary skill in the art in view of the teachings herein.

Figure 11:
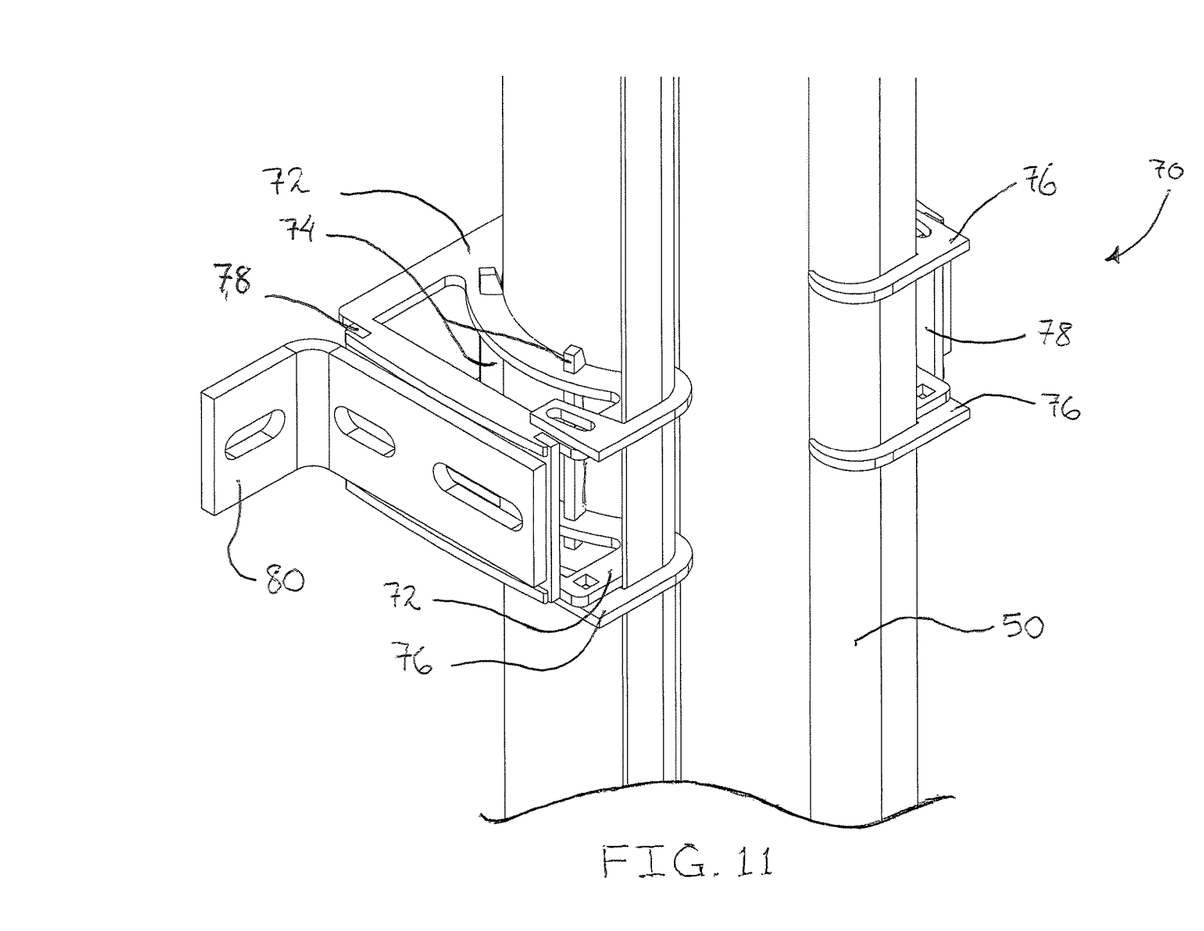
FIG. 11 depicts a perspective view of an embodiment of a rail bracket attached to the rail of FIG. 7.
Figure 12:
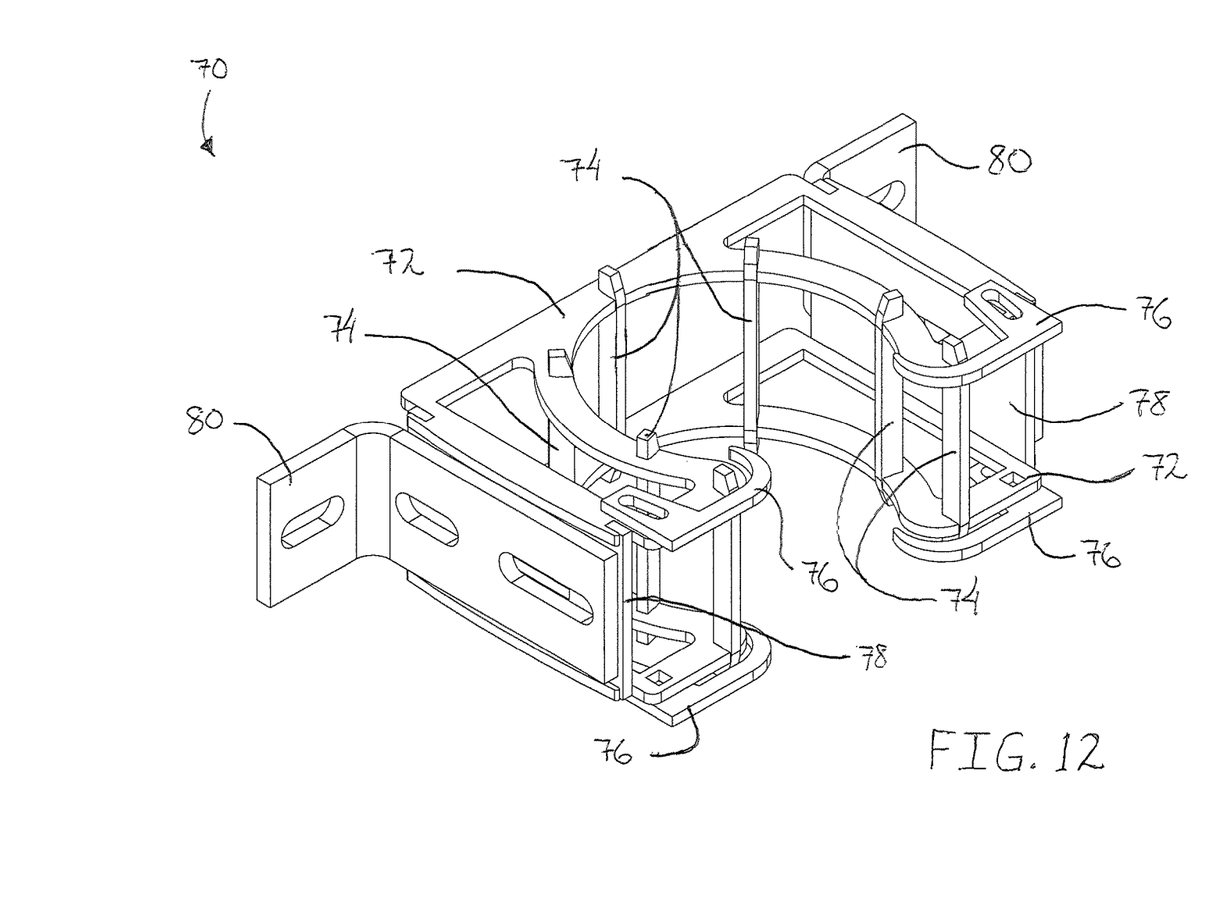
FIG. 12 depicts a perspective view of the rail bracket of FIG. 11, with the rail removed.

FIGS. 11 and 12 illustrate an exemplary rail bracket (70). Rail bracket (70) comprises wrap around brackets (72), vertical members (74), hooked members (76), mounting brackets (78), and L-brackets (80). Wrap around brackets (72) wrap around first curved portion (52) of rail (50). Each wrap around bracket (72) is connected to the other by vertical members (74). Hooked members (76) wrap around second curved portion (54) of rail (50). Each mounting bracket (78) attaches to a side of wrap around brackets (72) where mounting bracket (78) may provide a surface for L-bracket (80) to attach to.

Rail bracket (70) may rigidly affix rail (50) to hoistway (12) from the outside of rail (50). In particular, wrap around brackets (72) and hooked members (76) cooperatively engage rail (50) while leaving a portion of rail (50) open for access to hydraulic jacks (200). Vertical members (74) connect each wrap around bracket (72) to the other to provide stability. Mounting bracket (78) and L-bracket connect rail bracket (70) to hoistway (12). Although rail bracket (70) is shown as having a particular number of components having particular shapes, it should be understood, that any suitable configuration may be used to rigidly affix rail (50) to hoistway (12) from the outside of rail (50). Indeed, other suitable rail brackets (70) having components of varying shapes and configurations will be apparent to those of ordinary skill in the art in view of the teachings herein.

Having shown and described various embodiments of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

What is claimed is:

1. An elevator system for driving an elevator car within a hoistway, the elevator system comprising:
a pump;
at least one hydraulic jack in fluid communication with the pump, wherein an upper portion of the hydraulic jack is fixed at an upper portion of the hoistway, and wherein a lower portion of the hydraulic jack is fixed directly to the elevator car, wherein the hydraulic jack comprises a casing and one or more stages, wherein the casing and the one or more stages are configured to contain hydraulic fluid under pressure, wherein at least one of the stages is sealed such that an amount of hydraulic fluid within the sealed stage remains constant during operation of the pump; and
an accumulator in fluid communication with the pump, wherein the accumulator is configured to store energy during downward travel of the elevator car.

2. The hydraulic system of claim 1, wherein a maximum operating pressure of the hydraulic system is about 3500 psi.

3. The hydraulic system of claim 1, wherein the accumulator exchanges about 8 gallons of hydraulic fluid with the at least one hydraulic jack.

4. The hydraulic system of claim 1, further comprising a guide rail, wherein the upper portion of the hydraulic jack is suspended from an upper portion of the guide rail.

5. The hydraulic system of claim 4, wherein the accumulator is attached to the upper portion of the guide rail.

6. The hydraulic system of claim 1, wherein the hydraulic jack is configured retract in response to pressurizing hydraulic fluid within the casing and the one or more stages.

* * * * *